United States Patent Office 3,576,921
Patented Apr. 27, 1971

3,576,921
CHLORAMPHENICOL PHOSPHATES AND
PROCESS OF PREPARATION
André Allais, Les Lilas, and Michel Paturet, Sucy-en-Brie, France, assignors to Roussel-UCLAF, Paris, France
No Drawing. Filed Feb. 13, 1968, Ser. No. 704,996
Claims priority, application France, May 18, 1967,
106,809
Int. Cl. A61k 21/00; C07f 9/08
U.S. Cl. 260—944   12 Claims

ABSTRACT OF THE DISCLOSURE

A phosphate ester selected from the group consisting of the O-3-monophsophate of D-threo-1-para-X-phenyl-2-dichloroacetamido-propane-1,3-diol of the formula

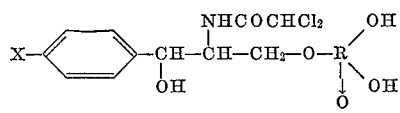

wherein X is a member selected from the group consisting of nitro, acetyl and methylsulfonyl, and its therapeutically-compatible salts, process of preparation of the phosphate ester and methods of therapy utilizing the phosphate ester. The said phosphate esters have an important antibiotic and bactericidal action coupled with excellent solubility in water.

THE PRIOR ART

Chloramphenicol and its analogues are known to have good antibiotic and bactericidal properties. They, however, suffer from the defect of having limited solubility in water. Many attempts have previously been made to find a solution to the problem posed by their poor solubility.

OBJECTS OF THE INVENTION

An object of the present invention is the obtention of a readily water-soluble derivative of chloramphenicol and its analogues.

Another object of the present invention is the obtention of a phosphate ester selected from the group consisting of the O-3-monophosphate of D-threo-1-para-X-phenyl-2-dichloracetamido-propane-1,3-diol of the formula

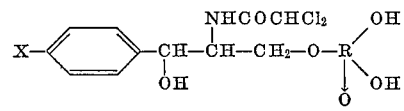

wherein X is a member selected from the group consisting of nitro, acetyl and methylsulfonyl, and its therapeutically-compatible salts, and particularly the monosodium salt of the O-3-phosphate of D-threo-1-paranitrophenyl-2-dichloracetamido-propane-1,3-diol.

A further object of the present invention is the development of a process for the preparation of the above phosphate esters which comprises the steps of (A) reacting dibenzyl chlorophosphonate with a D-threo-1-para-Z-phenyl-2-dichloracetamido-propane-1,3-diol of the formula

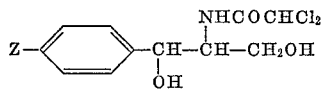

wherein Z is a member selected from the group consisting of nitro-acetyl and methylthio, in the presence of a tertiary base, (B) hydrolyzing the resultant dibenzyl phosphate of O-3-D-threo-1-para-Z-phenyl-2-dichloracetamido-propane-1,3-diol of the formula

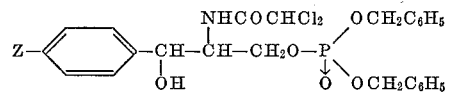

wherein Z has the above-assigned values, by the action of an acid agent, (C) salifying the resultant O-3-monophosphate of D-threo - 1 - para-Z-phenyl-2-amino-propane-1,3-diol of the formula

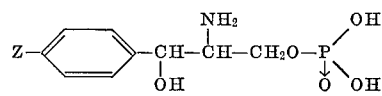

wherein Z has the above-assigned values, with a tertiary base, (D) reacting the resultant product with a lower alkyl dichloroacetate and a water-soluble salt of an alkaline earth metal, (E) acidifying the resultant alkaline earth metal salt of the O-3-monophosphate of D-threo-1-para-Z-phenyl - 2 - dichloroacetamido-propane-1,3-diol of the formula

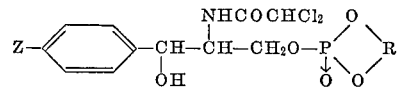

wherein Z has the above-assigned values and R represents an alkaline earth metal, by the action of an acid whose alkaline earth metal salt is insoluble, (F) separating the insoluble alkaline earth metal salt, and (G) recovering said phosphate ester. When Z represents the methylthio group, the compound of stage G is then oxidized to obtain the desired compound, where X represents the methyl sulfonyl group.

A yet further object of the present invention is the obtention of the novel intermediates:

(A) A dibenzyl phosphate of O-3-D-threo-1-para-Z-phenyl - 2 - dichloracetamide-propane-1,3-diol of the formula

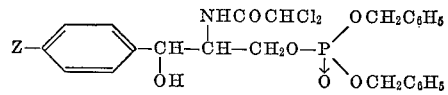

wherein Z represents a member selected from the group consisting of nitro, acetyl and methylthio.

(B) An O-3-monophosphate of D-threo-1-para-Z-phenyl-2-amino-propane-1,3-diol of the formula

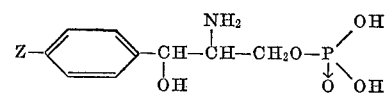

wherein Z represents a member selected from the group consisting of nitro, acetyl and methylthio.

(C) An alkaline earth metal salt of the O-3-monophosphate of D - threo - 1 - para-Z-phenyl-2-dichloracetamido-propane-1,3-diol of the formula

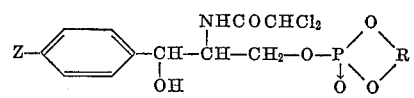

wherein Z represents a member selected from the group consisting of nitro, acetyl and methylthio and R represents an alkaline earth metal.

A still further object of the present invention is the obtention of pharmaceutical compositions containing an effective dosage amount of said phosphate esters.

Another object of the present invention is the development of a process for the treatment of bacilliary infections which comprises administering to the infected warmblooded animal or to infected humans from 15 mg./kg. to 80 mg./kg. a day of the said phosphate esters.

These and other objects of the present invention will become more apparent as the description thereof proceeds.

DESCRIPTION OF THE INVENTION

These objects have been achieved in the discovery of the O-3-monophosphates of D-threo-1-para-X-phenyl-2-dichloroacetamido - propane - 1,3 - diols of general Formula I

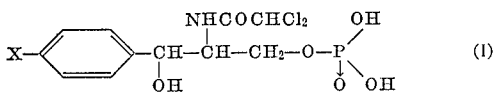

in which X represents the nitro, acetyl or methylsulphonyl group, as well as their therapeutically compatible salts.

With a view to simplification, these compounds will be designated each time this is convenient as phosphates of chloramphenicol or of thiamphenicol and their salts.

These new compounds, object of the invention, are endowed with very interesting antibiotic properties. They are, moreover, very soluble in water and can, for this reason, be administered in large doses without physiological intolerance.

The new phosphates of the invention show therapeutic effects which are superior to those of the antibiotics which form the base thereof. This improvement of the therapeutic effect is due essentially to the great solubility in water of the products of the invention, to their perfect tolerance in injection and to a certain delaying effect which allows the maintaining efficacious blood concentrations in a more prolonged way. This unexpected and non-evident character which is attached for this reason to these products is thus brought to light.

In fact, for a long time already, attempts have been made with a view to finding a solution to the problem posed by the poor solubility in water of chloramphenicol and its analogues. This problem is finally resolved by the present invention.

Also, it is known that in 1950, Poggi et al. thought they could prepare a phosphate of chloramphenicol by direct action of phosphoric acid on the antibiotic [Rev. Asoc. bioquim. argentina, 15, 273 (1950) summarized in Chemical Abstracts, 45 ,8722 g.].

The later attempts of Mosher et al. (J. Amer. Chem. Soc. 75, 4899 [1953]) to prepare a water-soluble derivative of chloramphenicol by phosphorylation led only to the obtaining of a cyclic phosphoric ester, lacking antibiotic activity. The American authors did not succeed in reproducing the experiments of their predecessors and concluded, on the basis of the physical constants, in favour of the identity between their cyclic product and that of Poggi et al.

In contrast, the products obtained by the process of the invention are true phosphoric acid esters and have retained all the antibiotic activity of the compound from which they were derived.

The process for preparing the new monophosphate compounds of general Formula I, as well as their therapeutically compatible salts, likewise an object of the invention, is characterized in that dibenzyl chlorophosphonate is reacted, in the presence of a tertiary base, with a D - threo-1-para-Z-phenyl-2-dichloracetamido-propane-1,3-diol of the general Formula II:

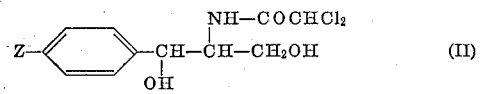

in which Z represents the nitro, acetyl or methylthio group. The resulting dibenzyl phosphate of O-3-D-threo-1-para-Z-phenyl-2-dichloracetamido - propane-1,3-diol of the general Formula III:

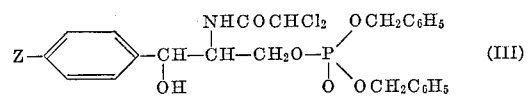

in which Z has the previously given meaning, is hydrolyzed with an acid agent, to obtain the O-3-monophosphate of D - threo-1-para-Z-phenyl-2-aminopropane-1,3-diol of the general Formula IV:

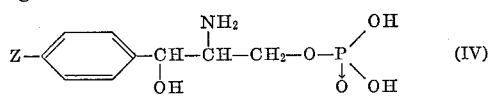

in which Z has the previously given meanings. This latter product is salified with a tertiary base and the product thus formed is treated successively with a lower alkyl dichloracetate and a water-soluble salt of an alkaline earth metal. The alkaline earth metal salt of the O-3-monophosphate of D - threo - 1 - para-Z-phenyl-2-dichloracetamido-propane-1,3-diol of the general Formula V:

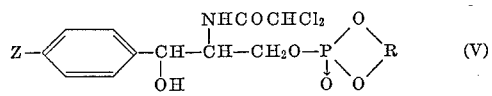

in which Z has the previously given meaning and R represents the chosen alkaline earth metal, is obtained. This last is acidified with an acid, the alkaline earth metal salts of which are insoluble, and the O-3-monophosphate of D-threo - 1 - para-Z-phenyl-2-dichloracetamido-propane-1,3-diol of the general Formula VI:

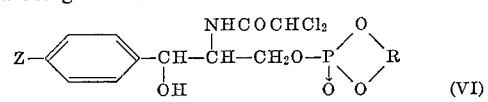

in which Z has the previously given meaning is obtained. When Z represents the nitro group or the acetyl group, the compound of the general Formula I is obtained. When Z represents the methylthio group, the compound of the general Formula VI is then oxidized to obtain the compound of the general Formula I where X represents the methylsulfonyl group. This O-3monophosphate of D-threo - 1 - para-X-phenyl-2-dichloracetamido-propane-1,3-diol of the general Formula I is then salified, if desired, by the action of a therapeutically compatible organic base or a therapeutically compatible alkali agent.

The process of the invention can be carried out advantageously as follows:

(1) The tertiary base in the presence of which the dibenzyl chlorophosphonate is reacted with the compound II is a tertiary base with an aromatic character, such as pyridine, 2,6-lutidine or ethyl methyl pyridine, and one operates at a temperature lying between +10° C. and −30° C.

(2) The acid agent utilized in the hydrolysis step is a strong mineral acid in an aqueous medium, such as sulphuric acid or hydrochloric acid. The liberated benzyl alcohol is separated and the excess acid agent is neutralized, preferably by a base which forms an insoluble salt with the acid agent, such as baryta.

(3) The tertiary base used to salify the 2-amino monophosphate IV is a tri-lower-alkylamine, such as triethylamine or tripropylamine. The lower alkyl dichloracetate is methyl dichloracetate or ethyl dichloracetate. The salification with the tertiary base and the condensation with the lower alkyl dichloracetate are effected in a polar organic solvent, such as a lower alkanol, for example, methanol. The water soluble salt of an alkaline earth metal is, for example, calcium chloride and the insoluble alkaline earth salt V is separated from an aqueous solution.

(4) The acid, the alkaline earth metal salts of which are insoluble, is preferably sulfuric acid. The reaction is effected in an aqueous media and in the presence of a third solvent poorly miscible with water such as ethyl acetate.

(5) The oxydation of the melthylthio group is effected by the action of a peracid, such as perbenzoic acid, perphthalic acid, peracetic acid or meta-chloroperbenzoic acid.

(6) The therapeutically compatible organic base is an amino acid, such as alanine or glycocoll.

(7) The thereapeutically compatible alkali agent is a salt of a weak acid, such as the acid carbonate, the acetate or the propionate of the desired metal, preferably an alkali metal.

The process of the invention described above is that which is actually preferred. But it is obvious to one skilled in the art that the desired result could likewise be attained if one subjected the product obtained after treatment of the O-3-monophosphate of D-threo-1-para-Z-phenyl-2-amino-propane-1,3-diol (compound IV) with a lower alkyl dichloracetate to the action of a therapeutically compatible organic base or of a therapeutically compatible alkali agent, thus to obtain directly a salt of a compound of general Formula I.

As has been indicated above, the products of the invention are endowed with interesting therapeutic properties. They possess specifically a considerable antibiotic and bactericidal action. Due to their great solubility in water, they can be administered in a massive way, without risk of physiological intolerance.

They can be used in human and animal therapy for the treatment of all serious bacilliary infections or those resistant to the usual antibiotics, infectious diseases, bronchopneumonias, enteritis, pyelonephritis due to staphylococci, streptococci, gonococci, meningococci, pneumococci, rickettsioses, shigelloses, brucelloses or to salmonelloses.

The products of the invention are administered orally, transcutaneously or locally in topical application on the skin and the mucosa, or rectally.

They can be presented in the form of injectable solutions, dispensed in ampoules, in self-injectable ampoules, in multi-dose phials or as sterile powder for the on-the-spot preparation of an injectable solution, as tablets, as coated tablets, as granules, as syrups, as suppositories, as ovules, as intravaginal tablets, as an ointment, as an eye-wash, as nose or ear drops, as a mouthwash and as topical pulverized powders.

The useful dosage ranges between 0.5 g. and 2 g. per dose and 1 to 5 g. per day in the adult depending on the route of administration.

The pharmaceutical forms such as: injectable solutions, tablets, coated tablets, granules, syrups, suppositories, ovules, intravaginal tablets, ointments, eye-washes, nose or ear drops, mouth-wash, topical pulverized powders, sterile powder for preparing an injectable solution, are prepared according to the usual processes.

The following examples are illustrative of the invention without in any way limiting the same.

EXAMPLE 1

Monosodium salt of the O - 3 - monophosphate of D-threo - 1 - para - nitrophenyl - 2 - dichloroacetamidopropane-1,3-diol Stage A: Dibenzyl phosphate of O-3-[D-threo-1-paranitrophenyl - 2 - dichloracetamido-propane-1,3-diol].—32.35 gm. of D-threo-1-para-nitrophenyl-2-dichloracetamido-propane - 1,3 - diol were dissolved in 65 cc. of pyridine, protected from humidity. The solution thus obtained was cooled to —25° C. and, over a period of 35 minutes, 36.5 gm. of dibenzyl chlorophosphonate [product prepared by the application of the process of Kenner, Todd and Weymouth, J. Chem. Soc., p. 3675 (1952)] were introduced, while maintaining the temperature of the reaction medium at —25° C. The reaction mixture was agitated for a further 2 hours at —10° C. and water was added thereto under agitation. The mixture was then poured into a mixture of a concentrated aqueous solution of hydrochloric acid and ice. The precipitate thus formd was isolated by suction-filtering. The precipitate was dissolved in ethyl acetate. The organic solution thus obtained was washed successively with a dilute aqueous solution of hydrochloric acid, with water, with an aqueous solution of sodium bicarbonate and finally with water. The organic solution was dried, then concentrated to dryness under reduced pressure. 69.1 gm. of the crude dibenzyl phosphate of O-3-[D-threo-1-paranitrophenyl - 2 - dichloracetamido - propane - 1,3 - diol] was isolated and used as such for the next stage.

A sample of this product purified by chromatography through silica gel had a specific rotation $$[a]_D^{20} = +1° \pm 1.5°$$

(c.=0.6% in chloroform).

*Analysis.*—Calc'd for $C_{25}H_{25}Cl_2N_2PO_8$ (molecular weight=583.36) (percent): C, 51.47; H, 4.32; Cl, 12.16; N, 4.8; P, 5.3. Found (percent): C, 51.4; H, 4.4; Cl, 12.2; N, 4.6; P, 5.3.

Ultraviolet spectrum (ethanol):
Infl. at about 265 m$\mu$ $\epsilon$=9,450
Max. at 269–270 m$\mu$ $\epsilon$=9,975

As far as is known, this product is not described in the literature.

Stage B: The O - 3 - monophosphate of D-threo-1-paranitro-phenyl-2-amino-propane-1,3-diol.—Into 210 cc. of a normal aqueous solution of sulfuric acid, while bubbling nitrogen therethrough, 69.1 gm. of the crude dibenzyl phosphate of O - 3 - [D - threo - 1 - para - nitrophenyl-2 - dichloracetamido - propane - 1,3 - diol] were introduced. The reaction medium was heated to reflux and the reflux was maintained for 8 hours. The reaction mixture was cooled and the benzyl alcohol thus formed was decanted. The aqueous phase was extracted with ethyl ether and admixed with 570 cc. of a 0.367 N solution of baryta so as to neutralize precisely the sulfuric acid. The barium sulfate thus formed was eliminated by filtration and the filtrate was concentrated to small volume, under reduced pressure. The precipitate thus formed was suction-filtered and dried. 24.4 gm. of the crude O-3-monophosphate of D - threo - 1 - para - nitrophenyl-2-amino-propane-1,3-diol was obtained having a melting point higher than 280° C. The product was used as such for the next stage.

The hydrolysis in the same conditions as above of the pure benzyl derivative provided a purer product, with melting point higher than 280° C. and a specific rotation $[a]_D^{20} = +6.5° \pm 1.5°$ (c.=1% in N caustic soda).

*Analysis.*—Calc'd for $C_9H_{13}N_2PO_7$ (molecular weight= 291.17) (percent): C, 36.99; H, 4.48; N, 9.59. Found (percent): C, 37.4; H, 4.6; N, 9.2.

Ultraviolet spectrum (ethanol):
Max. at 270–271 m$\mu$ $\epsilon$=9,380

As far as is known, this compound is not described in the literature.

Stage C: Dicalcium salt of the O - 3 - monophosphate of D - threo - 1 - para - nitrophenyl - 2 - dichloroacetamidopropane-1,3-diol.—21.2 gm. of the crude O-3-monophosphate of D - threo - 1 - para - nitrophenyl - 2 - aminopropane-1,3-diol were introduced into a mixture of 315 cc. of methanol and 21 cc. of triethylamine. The mixture was agitated and the insoluble matter which persisted was eliminated by filtration. 70 cc. of methyl dichloracetate were added to the filtrate. The reaction solution was heated to reflux and the reflux was maintained for one hour and thirty minutes. Thereafter, the reaction mixture was cooled and concentrated to dryness under reduced pressure. Water was added to the resiue and the pH of the mixture was brought to 8.0 by adding triethylamine. The aqueous alkali phase was extracted with ether. 102% of the theoretical quantity of $CaCl_2 \cdot 2H_2O$ in the form of an aqueous solution was added to the aqueous phase. The precipitate thus formed was isolated by suction-filtering and, after drying, 17.4 gm. of dicalcium salt of the O-3-monophosphate of D-threo - 1 - para-nitrophenyl - 2 - dichloroacetamido - propane - 1,3 - diol was obtained, having a melting point higher than 280° C. and a specific rotation $[\alpha]_D^{20} = +22°$ (c.=0.5% in acetone).

*Analysis.*—Calc'd for $C_{11}H_{11}Cl_2N_2PO_8Ca$ (molecular weight=441.19) (percent): C, 29.94; H, 2.51; N, 6.35; Cl, 16.07. Found (percent): C, 29.7; H, 2.7; N, 6.0; Cl, 15.7.

As far as is known, this compound is not described in the literature.

Stage D. The monosodium salt of the O - 3 - monophosphate of D - threo - 1 - para - nitrophenyl - 2 - dichloracetamido-propane-1,3-diol.—31 gm. of dicalcium salt of the O-3-monophosphate of D-threo - 1 - para-nitrophenyl - 2 - dichloracetamido - propane - 1,3 - diol were introduced into a mixture of 47 cc. of 3 N aqueous solution of sulfuric acid and 250 cc. of ethyl acetate and the suspension thus obtained was agitated vigorously for several minutes. The calcium sulfate thus formed was eliminated by filtration. The organic phase was separated by decanting. The aqueous phase was extracted with ethyl acetate. The extracts were added to the main organic phase and the organic solution thus obtained was washed with salt water, dried and concentrated to dryness under reduced pressure. The O-3-monophosphate of D-threo-1-para - nitrophenyl - 2 - dichloracetamido - propane-1,3-diol was obtained.

This product was dissolved in 300 cc. of water. Animal charcoal was added thereto and the solution was filtered. The pH of the filtrate was brought to 3.8 by adding an aqueous solution of sodium bicarbonate. The solution was again decolorized by addition of animal charcoal and filtration; then the water was evaporated off at a low temperature under reduced pressure, that is to say, by lyophilization.

21.8 gm. of the monosodium salt of the O-3-monophosphate of D-threo-1-para-nitrophenyl-2-dichloracetamido-propane-1,3-diol were thus obtained, melting point=about 160° C. and a specific rotation $[\alpha]_D^{20} = +5.5°$ (c.=1% in water).

The product is very soluble in water, soluble in alcohol and acetone and insoluble in ether.

*Analysis.*—Calculated for $C_{11}H_{12}Cl_2N_2PO_8Na$ (molecular weight=425.12) percent: C, 31.08; H, 2.84; Cl, 16.68; N, 6.6; Na, 5.4. Found (percent): C, 31.0; H, 3.0; Cl, 16.5; N, 6.3; Na, 5.25.

Ultraviolet spectrum (ethanol):

$\lambda_{max}$. 274 m$\mu$ $\epsilon$=9,480

As far as is known, this product is not described in the literature.

Operating in the same way as above, the monolithium salt of the O-3-monophosphate of D-threo-1-para-nitrophenyl - 2 - dichloracetamido-propane-1,3-diol, having a melting point of about 195° C., and the monopotassium salt of the O-3-monophosphate of D-threo-1-para-nitrophenyl - 2 - dichloracetamido-propane - 1,3 - diol, having a melting point of about 150° C., were prepared.

As far as is known, these products are not described in the literature.

Other therapeutically compatible salts of the O-3-monophosphate of D-threo-1-para-X-phenyl-2-dichloracetamido-propane-1,3-diols of the general formula

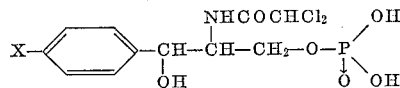

wherein X is selected from the group consisting of nitro, acetyl and methylsulfonyl, such as the alkali metal salts, organic amine salts, etc. can be prepared in a similar fashion.

These products possess particularly an important antibiotic and bactericidal action coupled with excellent solubility in water. They can be used in therapy for the same purposes as the parent D-threo-1-para-X-phenyl-2-dichloracetamido-propane-1,3-diols.

They can be prepared in the form of injectable solutions, put up in ampoules, in self injectable ampoules or multiple-dose flacons, or in the form of a sterile powder for extemporaneous preparation of injectable solutions, tablets, coated tablets, granules, syrups, suppositories, ovules, intravaginal tablets, ointments, eye-washes, nose or ear drops, mouthwashes, topical pulverized powders, etc.

Preferably, they are utilized in aqueous injectable solutions.

EXAMPLE 2

Example of preferred pharmaceutical form

A phial containing 1.32 gm. of the monosodium salt of O-3-monophosphate of D-threo-1-para-nitrophenyl-2-dichloracetamido-propane-1,3-diol, and an ampoule containing 10 cc. of sterile distilled water.

The useful dosology is controlled between about 8 mg./kg. and 35 mg./kg. per dose and 15 mg./kg. and 80 mg./kg. per day in humans and in the warm-blooded animal and between about 0.5 gm. and 2 gm. per dose and 1 gm. to 5 gm. per day in the adult as a function of the method of administration.

EXAMPLE 3.—PHARMACEUTICL STUDY

Determination "in vivo" of the therapeutic efficacy in experimental infections

The monosodium salt of the O-3-monophosphate of D-threo - 1 - para-nitrophenyl - 2 - dichloroacetamido-propane-1,3-diol, hereinafter called the monosodium salt of chloramphenicol phosphate, was administered subcutaneously to mice at different doses taking into account the fact that 1.32 mg. of the monosodium salt of chloramphenicol phosphate corresponds with 1.36 mg. of the monosodium salt of the hemisuccinate of chloramphenicol and with 1 mg. of chloramphenicol.

(1) Infections induced by staphylococci

Mice, divided into groups of ten each, were infected by intraperitoneal route, with 0.30 cc. of a culture of staphylococci (TIN strain). For two successive days following, the animals received subcutaneously (at intervals of 16 hours) the monosodium salt of chloramphenicol phosphate in comparison with the chloramphenicol.

The therapeutic effect was determined according to the rate of mortality of the animals as a function of time. The following results were obtained.

| Product administered | Unitary dose per mouse, mg. | Therapeutic action, percent |
|---|---|---|
| Monosodium salt of chloramphenicol phosphate | 6.60 | 100 |
|  | 2.64 | 86 |
|  | 1.32 | 76 |
|  | 0.66 | 29 |
| Chloramphenicol | 5 | 88 |
|  | 2 | 83 |
|  | 1 | 19 |
|  | 0.5 | 14 |

These results showed that the therapeutic effect of the studied product was superior to that of chloramphenicol. This improvement in the therapeutic effect, perceptibly indicated especially at the smallest doses, was due to the high solubility of the studied product, comparative with that of chloramphenicol, and also due to a certain retarding effect of the esterified form permitting the maintenance of efficacious blood levels in a more prolonged manner.

(2) Infections induced by hemolytic streptococci

An experimental infection was brought about in mice (groups of ten animals for each dose) by their inoculation with a culture of streptococci (strain M). The therapeutic effect, observed after subcutaneous administration of the studied product for 3 successive days following, in comparison with chloramphenicol, was as follows:

| Product administered | Unitary dose per mouse, mg. | Therapeutic action, percent |
|---|---|---|
| Monosodium salt of chloramphenicol phosphate | 13.2 | 87 |
|  | 6.6 | 72 |
| Chloramphenicol | 10 | 95 |
|  | 5 | 34 |

Here, the very distinct advantage of the studied product was observed at the dose of 6.6 mg. with regard to the corresponding dose of chloramphenicol (5 mg).

(3) Infections induced by typhoid bacilli

An experimental infection was brought about in mice (groups of ten animals for each dose) by their inoculation with a culture of *Salmonella typhi* (strain of clinical origin). The therapeutic effect, after the administration of one single dose of the studied product, given subcutaneously, was observed in comparison with doses of equivalent amounts of chloramphenicol and of the monosodium salt of the hemisuccinate of chloramphenicol.

The following values were observed.

| Product administered | Unitary dose per mouse, mg. | Therapeutic action, percent |
|---|---|---|
| Monosodium salt of chloramphenicol phosphate | 2.64 | 100 |
|  | 1.32 | 86 |
|  | 0.66 | 36 |
| Chloramphenicol | 2 | 100 |
|  | 1 | 76 |
|  | 0.5 | 34 |
| Monosodium salt of the hemisuccinate of chloramphenicol | 2.72 | 100 |
|  | 1.36 | 90 |
|  | 0.68 | 46 |

Here, a very good therapeutic effect of the studied product was observed. This effect was equal to those obtained from the comparison products.

(4) Infections induced with pyocyanic bacilli

In an experimental infection induced in the mice (groups of ten animals for each dose) by their inoculation with a pathogenic culture of *Pseudomonas aeruginosa,* the therapeutic effect was observed after subcutaneous administration of a single dose of the studied product, in comparison with corresponding ponderal doses of chloramphenicol or the monosodium salt of the hemisuccinate of chloramphenicol.

The following values were obtained.

| Product administered | Unitary dose per mouse, mg. | Therapeutic action, percent |
|---|---|---|
| Monosodium salt of chloramphenicol phosphate | 3.96 | 60 |
|  | 2.64 | 43 |
|  | 1.32 | 12 |
| Chloramphenicol | 3 | 50 |
|  | 2 | 35 |
|  | 1 | 9 |
| Monosodium salt of the hemisuccinate of chloramphenicol | 4.08 | 40 |
|  | 2.72 | 40 |
|  | 1.36 | 10 |

Here, the therapeutic effect of the studied product was superior to those effects obtained with chloramphenicol and the monosodium salt of the hemisuccinate of chloramphenicol.

In summary, the monosodium salt of chloramphenicol phosphate, administered subcutaneously as aqueous solution, showed a very good therapeutic efficacy in various generalized infections where the control animal succumbed rapidly. The tolerance, even at increased doses (13.2 mg. per mouse being 660 mg./kg.) was very satisfactory. The therapeutic effect was superior to that of chloramphenicol and obviously equal to that of the monosodium salt of the hemisuccinate of chloramphenicol.

Determination of the toxicity

The acuate toxicity in the mice was determined by intravenous administration. The average lethal dose ($DL_{50}$) was 2.22 gm./kg. ±0.15.

The chronic toxicity of the monosodium salt of chloramphenicol phosphate was studied by subcutaneously administering the product as aqueous solution, over a period of 4 weeks at the rate of six injections per week at doses of 100 and 200 mg./kg. No phenomenon of toxicity at all was observed in the rat.

The tolerance at intramuscular administration was very satisfactory in the rabbit. The intravenous administration did not provoke any phenomena of shock nor any painful manifestation in the rabbit or dog.

EXAMPLE 4

Clinical tests

Nineteen patients were treated (13 by intramuscular injection and 6 by intravenous perfusion) in the following clinical cases:

4—angiocholitis
4—febrile hepatic comas and encephalopathia of the portae and cava vena
3—sigmoiditis and febrile colic infections
1—pancreatitis with super-infected pseudocyst
1—phlebitis
1—pulmonary congestion in a cirrhotic patient
4—No specified infections The dosology consisted of one flacon (containing 1.32 gm. of the monosodium salt of the O-3-monophosphate of D - threo - 1 - paranitrophenyl-2-dichloracetamido-propane-1,3-diol) per day, the duration of the treatments lasting from 5 to 20 days.

The clinical results were excellent in all cases. The apyrexia was attained at the end of 2 to 4 days, the treatment being frequently pursued only in order to prevent a relapse. Even in cases of rather severe infections, a single daily injection proved sufficient.

The tolerance at intravenous administrations was perfect in all cases from the local as well as the general viewpoint. With intramuscular administration, a certain number of patients complained of a more or less sharp pain at the time of the injection, but never was any hardening of the tissue nor any edema observed following the injections.

The preceding specific embodiments are illustrative of the practice of the invention. It is to be understood, however, that other expedients known to those skilled in the art or disclosed herein, may be utilized without departing from the spirit of the invention or the scope of the appended claims.

We claim:

1. A phosphate ester selected from the group consisting of the O-3-monophosphate of D-threo-1-para-X-phenyl-2-dichloroacetamido-propane-1,3-diol of the formula

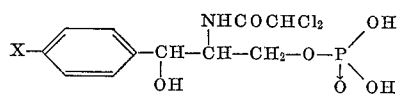

wherein X is a member selected from the group consisting of nitro, acetyl and methylsulfonyl, and its therapeutically compatible salts selected from the group consisting of alkali metals and amine salts of alanine and glycocol.

2. The compound of claim 1 wherein said phosphate ester is the O-3-monophosphate of D-threo-1-para-nitrophenyl-2-dichloroacetamido-propane-1,3-diol.

3. The compound of claim 1 wherein said phosphate ester is the monosodium salt of the O-3-monophosphate of D - threo - 1 - para - nitrophenyl-2-dichloracetamido-propane-1,3-diol.

4. The compound of claim 1 wherein said phosphate ester is the monolithium salt of the O-3-monophosphate of D - threo - 1 - para-nitrophenyl-2-dichloroacetamido-propane-1,3-diol.

5. The compound of claim 1 wherein said phosphate ester is the monopotassium salt of the O-3-monophosphate of D - threo - 1 - para - nitrophenyl-2-dichloroacetamido-propane-1,3-diol.

6. A dibenzyl phosphate of O-3-D-threo-1-para-Z-phenyl-2-dichloracetamido-propane-1,3-diol of the formula

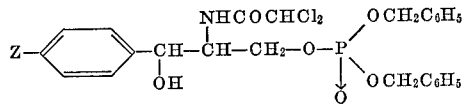

wherein Z represents a member selected from the group consisting of nitro, acetyl and methylthio.

7. An O-3-monophosphate of D-threo-1-para-Z-phenyl-2-amino-propane-1,3-diol of the formula

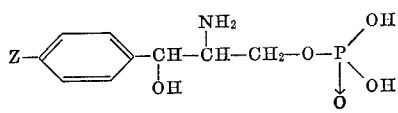

wherein Z represents a member selected from the group consisting of nitro, acetyl and methylthio.

8. An alkaline earth metal salt of the O-3-mono-phosphate of D - threo - 1-para-Z-phenyl-2-dichloracetamido-propane-1,3-diol of the formula

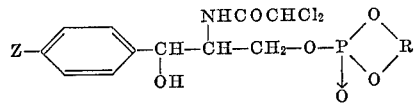

wherein Z represents a member selected from the group consisting of nitro, acetyl and methylthio and R represents an alkaline earth metal.

9. A process for the preparation of the phosphate ester of claim 1 which consists essentially of the steps of (A) reacting dibenzyl chlorophosphonate with a D-threo-1-para-Z-phenyl-2-dichloracetamido-propane-1,3-diol of the formula

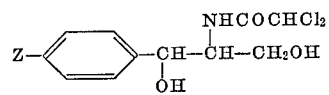

wherein Z is a member selected from the group consisting of nitro, acetyl and methylthio, in the presence of a tertiary amine base having an aromatic character selected from the group consisting of 2,6-lutidine, pyridine and ethyl methyl pyridine at temperatures of from −30° C. to +10° C., (B) hydrolyzing the resultant dibenzyl phosphate of O - 3 - D - threo - 1 - para-Z-phenyl-2-dichloroacetamido-propane-1,3-diol of the formula

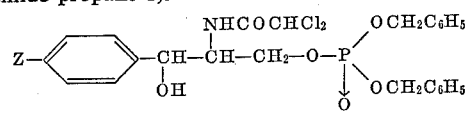

wherein Z has the above-assigned values, by the action of a strong mineral acid in an aqueous medium, (C) salifying the resultant O-3-monophosphate of D-threo-1-para-Z-phenyl-2-amino-propane-1,3-diol of the formula

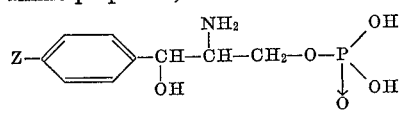

wherein Z has the above-assigned values, with a tri-lower-alkyl amine in the presence of a polar solvent, (D) reacting the resultant product with a lower alkyl dichloro-acetate in the presence of a polar organic solvent, (E) reacting the resultant product with a water-soluble acid salt of an alkaline earth metal in an aqueous medium, (F) acidifying the resultant alkaline earth metal salt of the O - 3 - monophosphate of D-threo-1-para-Z-phenyl-2-dichloroacetamido-propane-1,3-diol of the formula

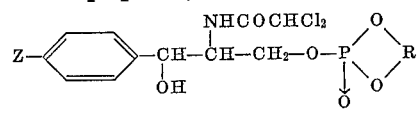

wherein Z has the above-assigned values and R represents an alkaline earth metal, in an aqueous medium by the action of an acid whose alkaline earth metal salt is insoluble in said aqueous medium, (G) separating the insoluble alkaline earth metal salt, and (H) recovering said phosphate ester.

10. The process of claim 9, step H wherein Z is methylthio and said recovering step consists of oxidizing the O-3-monophosphate of D-threo-1-para-methyl-thio-phenyl-2-dichloroacetamido-propane-1,3-diol by the action of a peracid selected from the group consisting of perbenzoic acid, perphthalic acid, peracetic acid and meta-chloroperbenzoic acid, and recovering said phosphate ester as the O - 3 - monophosphate of D-threo-1-para-methyl-sulfonyl-phenyl-2-dichloroacetamido-propane-1,3-diol.

11. The process of claim 9, step C wherein said strong mineral acid is a member selected from the group consisting of sulfuric acid and hydrochloric acid.

12. The process of claim 9, step C wherein said tri-lower-alkyl-amine is a member selected from the group consisting of triethylamine and tripropylamine.

References Cited

Poggi et al., "Chem. Abstracts," vol. 45 (1951), 8722.

C. B. PARKER, Primary Examiner

A. H. SUTTO, Assistant Examiner

U.S. Cl. X.R.

260—983; 424—211

UNITED STATES PATENT OFFICE
CERTIFICATE OF CORRECTION

PO-1050 (5/69)

Patent No. 3,576,921  Dated April 27, 1971

Inventor(s) Andre Allais et al

It is certified that error appears in the above-identified patent and that said Letters Patent are hereby corrected as shown below:

| Patent | | Appln. | | |
|---|---|---|---|---|
| Col. | Line | Pg | Line | |
| | | | | Only 1 priority application is indicated. |
| 1 | 20 | 1 | 8 | In the formula "R" should be -- P -- |
| 1 | 50 | 2 | 10 | In the formula "R" should be -- P -- |
| 1 | 71 | 3 | 2 | "nitro-acetyl" should be -- nitro,acetyl -- |
| 4 | 35 | 9 | 4 | In the formula |

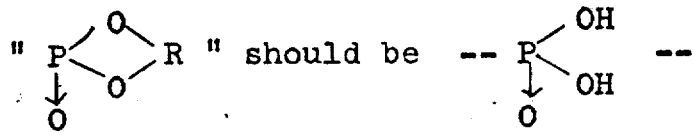

| 6 | 53 | 15 | 5 | "291.17" should be -- 292.17 -- |
| 10 | 70 | Amend B) Claim 1) | | "glycocol" should be -- glycocoll -- |
| 12 | 46 | Line 1) Claim 11) | | "step C" should be -- step B -- |

Signed and sealed this 18th day of April 1972.

(SEAL)
Attest:

EDWARD M. FLETCHER, JR.
Attesting Officer

ROBERT GOTTSCHALK
Commissioner of Paten